US006972866B1

(12) United States Patent
Bares et al.

(10) Patent No.: US 6,972,866 B1
(45) Date of Patent: Dec. 6, 2005

(54) DETECTING PROCESS NEUTRAL COLORS

(75) Inventors: Jan Bares, Webster, NY (US); Timothy W. Jacobs, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 940 days.

(21) Appl. No.: 09/678,582

(22) Filed: Oct. 3, 2000

(51) Int. Cl.[7] ........................... G06F 15/00; G06K 9/00
(52) U.S. Cl. ....................................... 358/1.9; 382/162
(58) Field of Search .......................... 358/1.9, 2.1, 500, 358/1.2, 296, 538, 540, 536, 534; 382/112, 382/176, 165, 167, 260, 118, 164

(56) References Cited

U.S. PATENT DOCUMENTS

| | | | | |
|---|---|---|---|---|
| 4,811,105 A | | 3/1989 | Kinoshita et al. | |
| 5,001,653 A | * | 3/1991 | Buchanan et al. | 358/1.2 |
| 5,032,904 A | * | 7/1991 | Murai et al. | 358/500 |
| 5,367,339 A | | 11/1994 | Lippincott | |
| 5,392,365 A | * | 2/1995 | Steinkirchner | 382/260 |
| 5,406,336 A | | 4/1995 | Harlos et al. | |
| 5,479,263 A | * | 12/1995 | Jacobs et al. | 358/3.17 |
| 5,495,428 A | * | 2/1996 | Schwartz | 382/164 |
| 5,668,890 A | * | 9/1997 | Winkelman | 382/167 |
| 5,673,075 A | * | 9/1997 | Jacobs et al. | 347/131 |
| 5,905,579 A | * | 5/1999 | Katayama et al. | 358/296 |
| 5,920,351 A | | 7/1999 | Takeshima et al. | |
| 5,956,468 A | * | 9/1999 | Ancin | 358/1.9 |
| 6,038,340 A | | 3/2000 | Ancin et al. | |
| 6,249,592 B1 | * | 6/2001 | Fan et al. | 382/112 |
| 6,252,675 B1 | * | 6/2001 | Jacobs | 358/1.9 |
| 6,289,122 B1 | * | 9/2001 | Karidi | 382/176 |
| 6,307,645 B1 | * | 10/2001 | Mantell et al. | 358/1.9 |
| 6,373,483 B1 | * | 4/2002 | Becker et al. | 345/419 |
| 6,377,702 B1 | * | 4/2002 | Cooper | 382/167 |
| 6,421,142 B1 | * | 7/2002 | Lin et al. | 358/1.9 |
| 6,473,202 B1 | * | 10/2002 | Kanata et al. | 358/2.1 |
| 6,480,624 B1 | * | 11/2002 | Horie et al. | 382/165 |
| 6,529,291 B1 | * | 3/2003 | Schweid et al. | 358/1.9 |
| 6,775,032 B2 | * | 8/2004 | Jacobs | 358/3.14 |
| 2001/0030769 A1 | * | 10/2001 | Jacobs | 358/429 |
| 2002/0075491 A1 | * | 6/2002 | Bares | 358/1.9 |
| 2003/0179911 A1 | * | 9/2003 | Ho et al. | |
| 2003/0206307 A1 | * | 11/2003 | Handley et al. | |

FOREIGN PATENT DOCUMENTS

| | | | | |
|---|---|---|---|---|
| JP | 03040078 A | * | 2/1991 | G06K 9/20 |

* cited by examiner

*Primary Examiner*—Madeleine Nguyen
(74) *Attorney, Agent, or Firm*—Fay, Sharpe, Fagan, Minnich & McKee, LLP

(57) ABSTRACT

A method for classifying pixels into one of a neutral category and a non-neutral category inputs a group of pixels within an image into a memory device. A color of each of the pixels is represented by a respective color identifier. An average color identifier is determined as a function of the color identifiers of the pixels in the group. One of the pixels within the group are classified into one of the neutral category and the non-neutral category as a function of the average color identifier.

16 Claims, 4 Drawing Sheets

DETECTING PROCESS NEUTRAL COLORS

BACKGROUND OF THE INVENTION

The present invention relates to digital printing. It finds particular application in conjunction with detecting and differentiating neutrals (e.g., grays) from colors in a halftone image and will be described with particular reference thereto. It will be appreciated, however, that the invention is also amenable to other like applications.

At times, it is desirable to differentiate neutral (e.g., gray) pixels from color pixels in an image. One conventional method for detecting neutral pixels incorporates a comparator, which receives sequential digital values corresponding to respective pixels in the image. Each of the digital values is measured against a predetermined threshold value stored in the comparator. If a digital value is greater than or equal to the predetermined threshold value, the corresponding pixel is identified as a color pixel; alternatively, if a digital value is less than the predetermined threshold value, the corresponding pixel is identified as a neutral pixel.

The color pixels are typically rendered on a color printing output device (e.g., a color printer) using the cyan, magenta, yellow, and black ("CMYK") colorant set. The neutral pixels are typically rendered using merely the black K colorant. Although it is possible to render neutral pixels using a process black created using the cyan, magenta, and yellow ("CMY") colorants, the CMY colorants are typically more costly than the black K colorant. Therefore, it is beneficial to identify and print the neutral pixels using merely the black K colorant.

The conventional method for differentiating the neutral pixels from the color pixels in an image often fails when evaluating a scanned halftone image. For example, a pixel in the halftoned image may appear as a neutral (i.e., gray) to the naked human eye when, in fact, the pixel represents one dot of a color within a group of pixels forming a process black color using the CMY colorants. Because such pixels are actually being used to represent a process black color, it is desirable to identify those pixels as neutral and render them merely using the black K colorant. However, the conventional method for detecting neutral pixels often identifies such pixels as representing a color, and, consequently, renders those pixels using the CMY colorants.

The present invention provides a new and improved method and apparatus which overcomes the above-referenced problems and others.

SUMMARY OF THE INVENTION

A method for classifying pixels into one of a neutral category and a non-neutral category inputs a group of pixels within an image into a memory device. A color of each of the pixels is represented by a respective color identifier. An average color identifier is determined as a function of the color identifiers of the pixels in the group. One of the pixels within the group is classified into one of the neutral category and the non-neutral category as a function of the average color identifier.

In accordance with one aspect of the invention, the group of pixels are input by receiving the color identifiers into the memory device according to a raster format.

In accordance with another aspect of the invention, the pixel in the group is classified by comparing the average color identifier with a threshold color identifier function.

In accordance with another aspect of the invention, the pixels are classified by determining if the average color identifier corresponds to one of a plurality of neutral colors.

In accordance with another aspect of the invention, if the pixel within the group is classified to be in the neutral category, the pixel is rendered as one of a plurality of neutral colors; if the pixel within the group is classified to be in the non-neutral category, the pixel is rendered as one of a plurality of non-neutral colors.

In accordance with another aspect of the invention, an output of the pixels within the group is produced.

In accordance with a more limited aspect of the invention, the output is produced by printing a color associated with the average color identifier, via a color printing device, for each of the pixels within the group.

In accordance with another aspect of the invention, the color identifiers include components of a first color space. Before the determining step, the first color space components of the color identifiers are transformed to a second color space. Furthermore, the classifying step compares the average color identifier in the second color space with a threshold color identifier in the second color space. The threshold color identifier is determined as a function of a position along a neutral axis in the second color space.

One advantage of the present invention is that it reduces the number of pixels which are detected as non-neutral colors, but that are actually used to form a process neutral color.

Another advantage of the present invention is that it reduces the use of CMY colorants.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
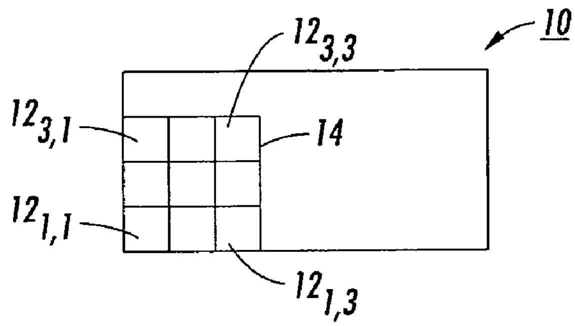
FIG. 1 illustrates a halftoned image including a plurality of pixels.

With reference to FIG. 1, a halftoned image 10 includes a plurality of pixels 12. For example, in the preferred embodiment, the halftone cell 14 in the original image is captured by the scanner as a 3×3 pixel object, which includes nine (9) pixels (i.e., dots) 14. Each of the nine (9) dots is a source of an RGB signal that an observer's eye integrates into a certain color (e.g., blue).

Figure 2:
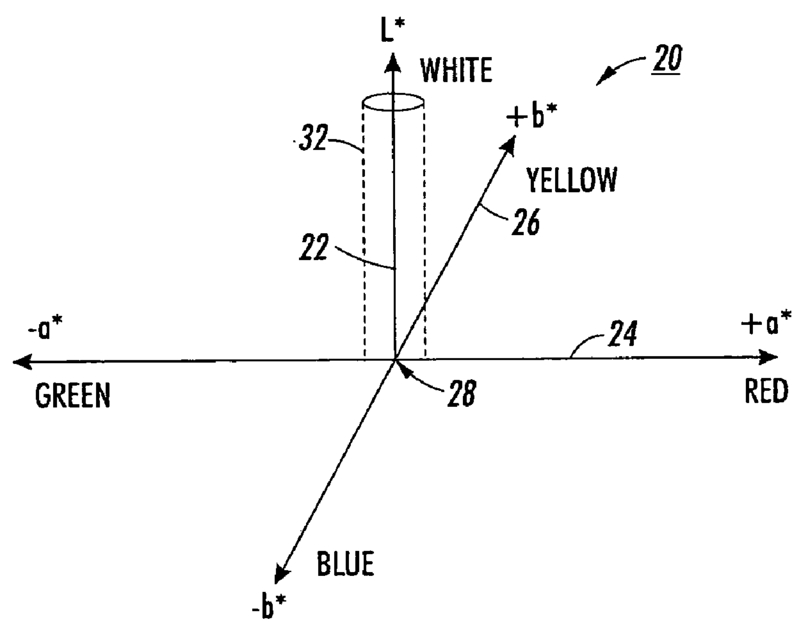
FIG. 2 illustrates axes showing the L*a*b* color space.

With reference to FIG. 2, neutral colors in the preferred embodiment are determined within the L*a*b* color space 20, which is generally defined by three (3) axes (i.e., the L* axis 22, the a* axis 24, and the b* axis 26). The L* axis 22 represents a neutral axis that transitions from black to white; the a* axis 24 transitions from green to red; and the b* axis 26 transitions from blue to yellow. A point 28 at which the three (3) axes 22, 24, 26 intersect represents the color black. Because the L* axis 22 transitions from black to white, positions along the L* axis represent different gray-scale levels. Furthermore, close-to-neutral colors are defined as:

$$a^{*2}+b^{*2}<T_n(L^*)$$

where:

$a^{*2}+b^{*2}$ represents a square of the distance from the L* axis at any point (a*, b*) along the L* axis; and $\sqrt{T_n(L^*)}$ defines respective distances, or thresholds, from the L* axis, above which a color of lightness L* is no longer considered neutral.

In the preferred embodiment, the function $T_n(L^*)$ is represented as a cylinder 32. Therefore, all points in the L*a*b* color space that are within the cylinder 32 are considered neutral colors; furthermore, all points in the L*a*b* color space that are on or outside of the cylinder 32 are considered non-neutral colors. Although the function $T_n(L^*)$ is represented in the preferred embodiment as a cylinder, it is to be understood that the function $T_n(L^*)$ may take different forms in other embodiments. It is to be understood that although the preferred embodiment is described with reference to determining neutral colors in the L*a*b* colors space, other color spaces are also contemplated.

In an alternate embodiment, neutral colors in the preferred embodiment are determined within the L*C*h* color space, in which $C^{*2}=a^{*2}+b^{*2}$ (i.e., C* and h* are polar coordinates in the a*,b* plane of the L*a*b* color space). In this case, the close-to-neutral colors are defined by comparing the average color identifier in the L*C*h* space (the chroma C*) with a chroma threshold $C^*_{threshold}(L^*,h^*)$ that is determined as a function of two (2) coordinates, L* and a hue angle h*.

Regardless of what color space is used, neutral colors are defined as those colors surrounding a neutral axis.

Figure 3:
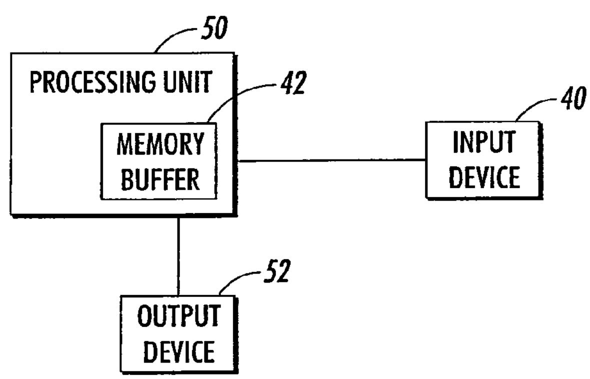
FIG. 3 illustrates a device for detecting process neutral colors according to the present invention.
Figure 4:
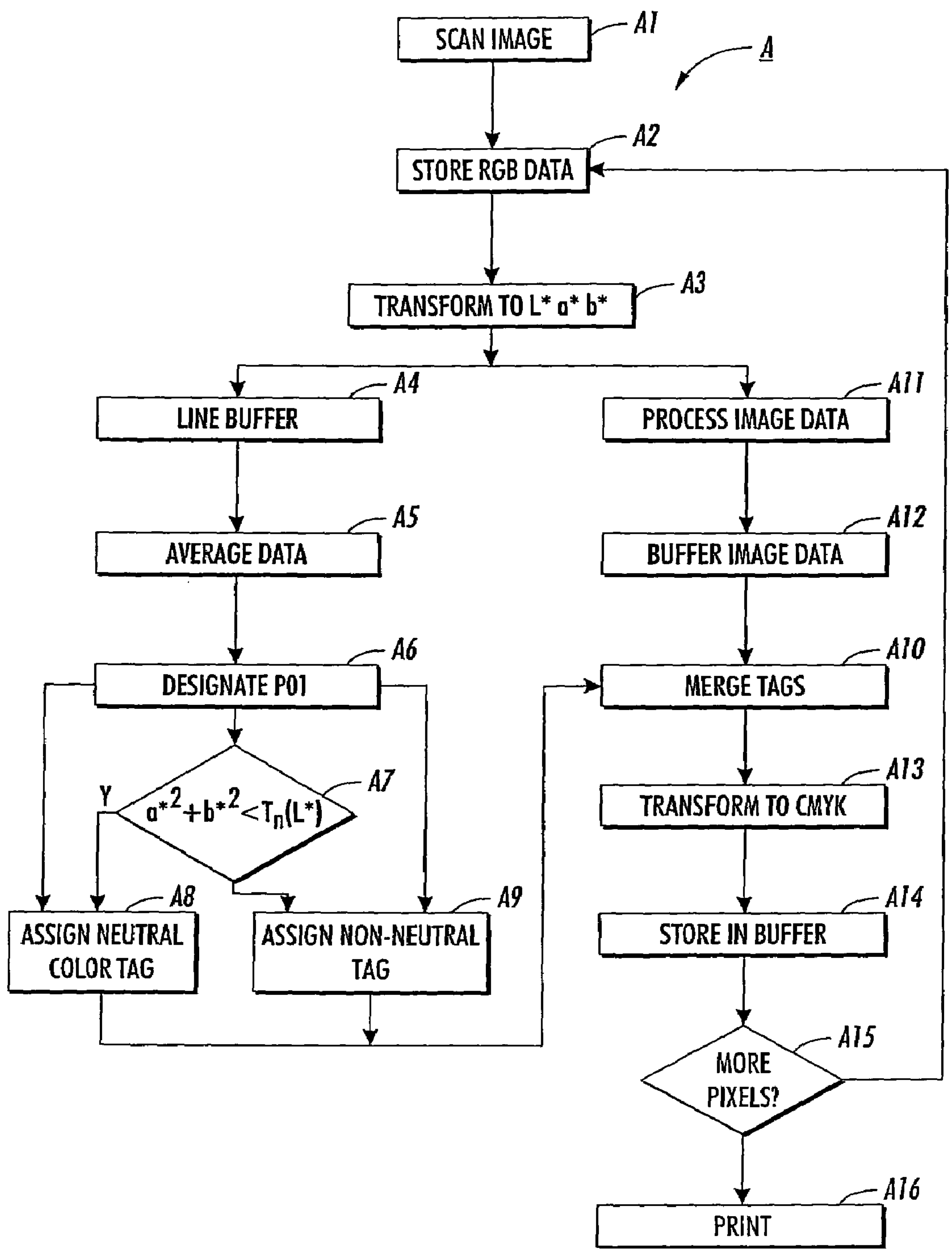
FIG. 4 illustrates a preferred method for processing an image to detect process neutral colors according to the present invention.

With reference to FIGS. 1, 3, and 4, a preferred method A for processing an image to detect process neutral colors is shown. An image is scanned in a step A1 using an input device 40 (e.g., a scanning input device). In this manner, each of the pixels within the image is associated with a color identifier. More specifically, the input device 40 rasterizes the image by transforming the pixels 12 into components of a first color space (e.g., the red-green-blue ("RGB") color space). Each of the components of the RGB color space serves as a color identifier of the respective pixels 12. The rasterized RGB image data stream is stored, in a step A2, in a memory buffer device 42 and transformed, in a step A3, into a second color space (e.g., L*a*b* or L*C*h*).

The rasterized RGB image data stream is stored, in a step A4, into line buffer devices. By way of example, the buffers supply a stream of three (3) consecutive raster lines with pixels of interest in the second stream. The image data is averaged in a step A5, and a current pixel of interest ("POI") is identified in a step A6. More specifically, the averaging filter in the step A5 computes, at any moment, an average of a sub-group 14 of a specified number of the pixels 12 (e.g., a sub-group of nine (9) pixels $12_{1,1}$, $12_{1,2}$, $12_{1,3}$, $12_{2,1}$, $12_{2,2}$, $12_{2,3}$, $12_{3,1}$, $12_{3,2}$, $12_{3,3}$) within the image 10. The pixel of interest in this example is the pixel $12_{2,2}$. It is to be understood that every pixel 12 within the image 10 is, in this example, included within nine averaging filters (except for pixels included in single pixel lines along the image edges).

In the preferred embodiment, the smallest averaging filter (i.e., sub-group of pixels) includes the number of pixels in the halftone cell (e.g., the nine (9) pixels $12_{1,1}$, $12_{1,2}$, $12_{1,3}$, $12_{2,1}$, $12_{2,2}$, $12_{2,3}$, $12_{3,1}$, $12_{3,2}$, $12_{3,3}$ in the halftone cell 14). Therefore, the reference numeral 14 is used to designate both the halftone cell and one of the averaging filters. It is to be understood that other sub-groups of pixels (i.e., averaging filters) including a larger number of pixels than included in the halftone screen cell are also contemplated.

In the first path (steps A4–A9), the L*a*b* image data pass to the line buffers to provide a data stream for the averaging filter, which is averaged in the step A4. The POI is identified in the step A6 as $12_{2,2}$, and an averaged color identifier is produced in the averaging filter 14 in the step A5. For example, each of the nine (9) L* components in the sub-group 14 is averaged; each of the nine (9) a * components in the sub-group 14 is averaged; and each of the nine (9) b* components in the sub-group 14 is averaged. Then, in a step A7, a determination is made, whether:

$$a^{*}_{avg}{}^{2}+b^{*}_{avg}{}^{2}<T_n(L^{*}_{avg})$$

where:

$a^{*}_{avg}{}^{2}+b^{*}_{avg}{}^{2}$ represents the square of the distance from the L* axis at any point (a*, b*) along the L* axis; and $\sqrt{T_n(L^*)}$ defines respective distances from the L* axis or thresholds, above which a color of lightness L* is no longer considered neutral.

Therefore, if $a^{*}_{avg}{}^{2}+b^{*}_{avg}{}^{2}<T_n(L^{*}_{avg})$, it is determined in the step A7 that the averaged components ($L^*_{avg}$, $a^*_{avg}$, $b^*_{avg}$) represent a neutral color; otherwise it is determined in the step A7 that the averaged components ($L^*_{avg}$, $a^*_{avg}$, $b^*_{avg}$) represent a non-neutral color.

If the step A7 determines the averaged components ($L^*_{avg}$, $a^*_{avg}$, $b^*_{avg}$) represent a neutral color, control passes to a step A8 and a tag indicating a neutral color is attached to the POI; in this example to the pixel $12_{2,2}$. Otherwise control passes to a step A9 for attaching a tag to the POI indicating a non-neutral color. In the preferred embodiment, a neutral color is indicated by a tag of zero (0) and a non-neutral color is indicated by a tag of one (1). Regardless of whether a neutral or non-neutral color is identified, control then passes to a step A10 in the second path of the process (which includes steps A11–A16).

The L*a*b* image is also routed to the second path. In the second path, the L*a*b* image data is processed, in a step A11, by a processing unit 50 and stored in the memory buffer device 42 in a step A12. More specifically, data streams are synchronized in the step A11 in order that the neutral/non-neutral tag is attached to the corresponding POI in the step A10. The proper synchronization is achieved by the buffer memory step A4 in the first path and a buffer image memory step A12 in the second path. Although the preferred embodiment shows the memory buffer unit 42 included within the processing unit 50, it is to be understood that other configurations are also contemplated.

The tag associated with the POI image data is merged, in the step A10, with other tags associated with the POI. For example, if the POI is determined in the step A7 to be of a process neutral color, a tag of zero (0) is added to other tags attached to the POI in the step A10; on the other hand, if the POI is determined in the step A7 to be of a non-process neutral color, a tag of one (1) is added to other tags attached to the POI in the step A10.

The pixel stream is transformed, in a step A13, into the CMYK color space, as a function of the tags associated with the individual pixels. In the preferred embodiment, if the tag associated with a pixel is zero (0) (i.e., if the pixel is identified as a process neutral color), the L*a*b* data is transformed into the CMYK color space using only true black K colorant. On the other hand, if the tag associated with a pixel is one (1) (i.e., if the pixel is identified as a non-process neutral color), the L*a*b* data is transformed into the CMYK color space using all four (4) of the colorants CMYK.

In an alternate embodiment, if the tag associated with the pixel is zero (0) (i.e., if the pixel is identified as a neutral color), the L*a*b* data is transformed utilizing a 100% gray component replacement ("GCR") approach (i.e., adjust amounts of the process colors to completely replace one of the process colors with a black colorant). On the other hand, if the tag associated with a pixel is one (1) (i.e., if the pixel is identified as a non-neutral color), the RGB data is transformed into the CMYK color space using a variable GCR approach (i.e., adjust amounts of the process colors to partially replace the process colors with a black colorant).

Once the L*a*b* data is transformed into the CMYK color space, the image data for the pixels are stored in the image buffer 42 in a step A14. Then, a determination is made in a step A15 whether all the pixels 12 in the image 10 have been processed. If all the pixels 12 have not been processed, control returns to the step A2; otherwise, control passes to a step A16 for printing the image data for the processed pixels, which are stored in the image buffer, to an output device 52 (e.g., a color printing device such as a color printer or color facsimile machine).

Figure 5:
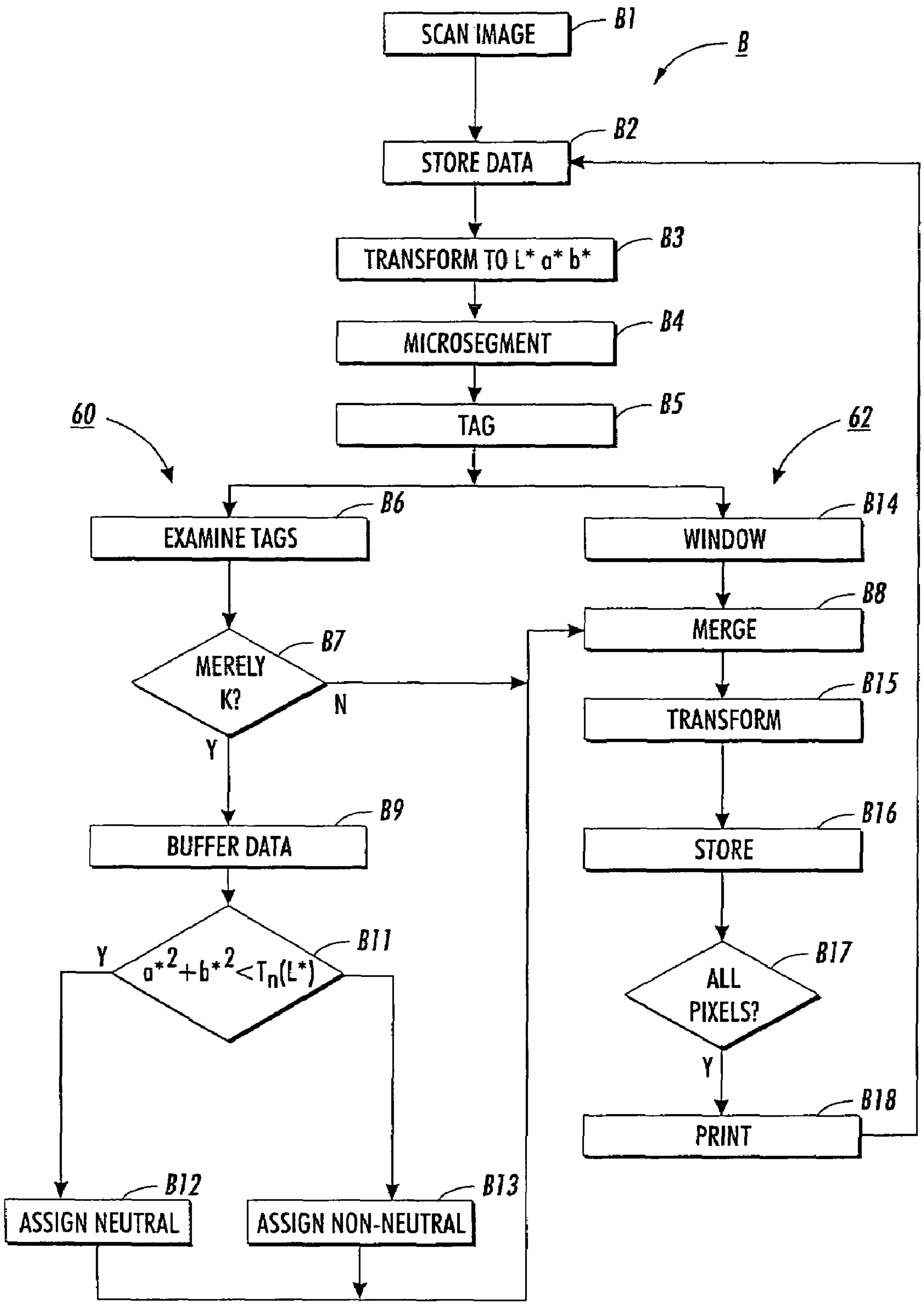
FIG. 5 illustrates an alternate method for processing an image to detect process neutral colors according to the present invention.

With reference to FIGS. 1, 3, and 5, an alternate method B for processing an image to detect process neutral colors is shown. This alternate method utilizes autosegmentation for determining objects (rendering classes) within an image. The image 10 is scanned in a step B1 using the input device 40. As discussed above, the input device 40 rasterizes the image by transforming the pixels 12 into the RGB color space. The RGB image data stream is stored in the memory buffer device 42 in a step B2 and transformed into the L*a*b* color space in a step B3. A microsegmentation step B4 determines, for each pixel, the rendering mode in which the respective pixel occurred in the scanned original image (e.g., halftone or contone) and tags the pixel accordingly. For example, the step B4 of microsegmentation determines if the pixel is included in an edge between two (2) objects or within a halftone area. For the purpose of this description, halftone is understood to be any image rendering by dots placed either in a regular or a random pattern. The step B4 of microsegmentation may also determine if the POI is included within halftone or contone portions of the image 10. If the POI is included within a halftone, an estimate of the halftone frequency is also determined and stored in another tag associated with the pixel. The image data associated with the POI is tagged, in a step B5, to identify the results of the microsegmentation. More specifically, the POI may be tagged with a zero (0) to indicate that the POI is included within an object; alternatively, the POI may be tagged with a one (1) to indicate that the POI is included within an edge.

As in the first embodiment, the image data, which includes the microsegmentation tag, is then passed to two (2) paths 60, 62 of the method for processing the image to detect process neutral colors. It is to be understood that the tags associated with the POI in the microsegmentation step B4 identify, for particular rendering strategies, whether neutral determination is necessary and, if the POI is part of a halftone, an estimate of the halftone frequency.

Therefore, in the first path 60, the processor 50 examines the microsegmentation tags, in a step B6, to determine if the POI is included within a halftone/contone image. Then, based upon a predetermined rendering strategy, the step B7 determines if it is necessary to identify the POI to be rendered using merely black K colorant. If it is not necessary to make a determination between neutral and non-neutral pixels, control passes to a step B8; otherwise, control passes to a step B9.

In the step B9, the image data associated with the current POI is stored in the image buffer 42. The size of the averaging filter is previously selected in the step B6 according to the detected halftone frequency. The minimum size of the averaging filter is relatively large for a low frequency halftone and relatively smaller for a high frequency halftone. In other words, the minimum size of the averaging filter is determined as a function of the halftone frequency. Therefore, chroma artifacts, which are caused by possible neutral/color misclassifications when a single averaging filter size is used, are minimized.

In a step B11, a determination is made whether:

$$a^*_{avg}{}^2+b^*_{avg}{}^2<T_n(L^*_{avg})$$

where:

- $a^*_{avg}$ represents averaged a* coordinates in the averaging filter;
- $b^*_{avg}$ represents averaged b* coordinates in the averaging filter;
- $a^*_{avg}{}^2+b^*_{avg}{}^2$ represents a distance from the L* axis; and
- $T_n(L^*_{avg})$ defines a square of the decision distance from the L* axis, at the point $L^*_{avg}$, at which a classification from neutral colors to non-neutral colors occurs.

Therefore, if $a^*_{avg}{}^2+b^*_{avg}{}^2<T_n(L^*_{avg})$, it is determined in the step B11 that the co average represents a neutral color; otherwise it is determined in the step B11 that the average represents a non-neutral color. As in the first embodiment, an appropriate tag is associated with the POI in one of the steps B12, B13.

In the second path 62, the image data is windowed, in a step B14, according to well known techniques. It suffices for the purpose of this invention to define windowing as the second step of the autosegmentation procedure. In this step, according to predetermined rules, pixels are grouped into continuous domains Then, in the step B8, which receives image data from both the first and second paths, the neutral/non-neutral tags are added, for each pixel, to all other tags.

The image data are transformed, in a step B15, to CMYK color space as a function of the respective tags. More specifically, if the tag indicates the pixels represent a neutral color, the pixels are transformed into the CMYK color space using merely black K colorant; if the tag indicates the pixels represent a non-neutral color, the pixels are transformed into the CMYK color space using each of the four (4) cyan, magenta, yellow, and black colorants. Then, in a step B16, the CMYK image are stored in the image buffer 42.

A determination is made in a step B17 whether all the pixels in the image 10 have been processed. If more pixels remain to be processed, control returns to the step B2; otherwise, control passes to a step B18 to print the pixels in the CMYK color space.

It is to be appreciated that it is also contemplated to use image microsegmentation tags for selecting the averaging filter size wherever a halftone of a specific frequency is detected. Such use of image microsegmentation tags enables the process to proceed with image averaging and neutral detection while the windowing part of the autosegmentation is taking place, thus reducing a timing mismatch and the necessary minimum size of the buffers.

It is also contemplated that neutral detection be performed on a compressed and subsequently uncompressed image. More specifically, the chroma values may be averaged over larger size blocks (e.g., 8×8 pixels). Such averaging has the same beneficial effect on neutral detection as the filtering described in the above embodiments.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A method for classifying pixels into one of a neutral category and a non-neutral category, the method comprising:

inputting a group of pixels within an image into a memory device, a color of each of the pixels being represented by a respective color identifier, wherein the color identifiers include components of a first color space;

transforming the first color space components of the color identifiers to a second color space;

determining an average color identifier of the group of pixels as a function of the color identifiers of the pixels in the group; and classifying one of the pixels within the group into one of the neutral category and the non-neutral category as a function of the average color identifier by comparing the average color identifier in the second color space with a threshold color identifier in the second color space, the threshold color identifiers being determined as a function of a position along a neutral axis in the second color space.

2. The method for classifying pixels into one of a neutral category and a non-neutral category as set forth in claim 1, wherein the inputting step includes:

receiving the color identifiers into the memory device according to a raster format.

3. The method for classifying pixels into one of a neutral category and a non-neutral category as set forth in claim 1, wherein the classifying step includes:

comparing the average color identifier with a threshold color identifier function.

4. The method for classifying pixels into one of a neutral category and a non-neutral category as set forth in claim 1, wherein the classifying step includes:

determining if the average color identifier corresponds to one of a plurality of neutral colors.

5. The method for classifying pixels into one of a neutral category and a non-neutral category as set forth in claim 1, further including:

if the pixel within the group is classified to be in the neutral category, rendering the pixel as one of a plurality of neutral colors; and if the pixel within the group is classified to be in the non-neutral category, rendering the pixel as one of a plurality of non-neutral colors.

6. The method for classifying pixels into one of a neutral category and a non-neutral category as set forth in claim 1, further including:

producing an output of the pixels within the group.

7. The method for classifying pixels into one of a neutral category and a non-neutral category as set forth in claim 6, wherein the producing step includes:

for each of the pixels within the group, printing a color associated with the average color identifier via a color printing device.

8. A system for detecting neutral colors, comprising:

an input device for inputting data associated with an image;

a buffer memory for receiving and storing portions of the image data; and a processing unit for averaging groups of the image data, determining if the respective groups represent one of a neutral and non-neutral color, and identifying and classifying one of the pixels within the respective groups as being one of a plurality of neutral and non-neutral colors, wherein the processing unit segments the image for identifying rendering classes in the image and determining if the respective groups of the image data are included in any of the classes, the processing unit further determining if the respective groups represent one of the neutral and the non-neutral colors as a function of whether group of the image data is included in one of the classes.

9. The system for detecting neutral colors as set forth in claim 8, wherein the processing unit transforms all of the image data within a respective group into a color space capable of forming neutral colors from both a combination of non-neutral colorants and a neutral colorant, the processor rendering the image data within the groups identified as one of the neutral colors using only the neutral colorant and rendering the image data within the groups identified as one of the non-neutral colors using the combination of the neutral and non-neutral colorants.

10. The system for detecting neutral colors as set forth in claim 9, wherein the color space is L*C*h*.

11. The system for detecting neutral colors as set forth in claim 9, further including:

an output device for outputting the rendered image data.

12. The system for detecting neutral colors as set forth in claim 11, wherein the output device is a color printing device.

13. The system for detecting neutral colors as set forth in claim 8, wherein the processing unit determines if the respective groups represent one of the neutral and the non-neutral colors by comparing average color identifiers of the respective image data within the groups with a threshold function.

14. A method for detecting neutral colors, the method comprising:

inputting a group of pixels within an image into a buffer memory, a color of each of the respective pixels being one of a plurality of neutral and a plurality of non-neutral colors the inputting step including, scanning image data representing the group of pixels into the buffer memory in an RGB color space;

determining an average color of the group of pixels;

transforming the average color into one of a L*a*b* and a L*C*h* color space; and detecting if the group of pixels represents one of the neutral colors as a function of the average color including, comparing the average color of the one of the L*a*b* color space data and the L*C*h* color space data with a threshold function value, which is determined as a function of L*.

15. The method for detecting neutral colors as set forth in claim 14, further including:

if the group of pixels is detected as one of the neutral colors, rendering one of the pixels of the group in a CMYK color space using only a neutral colorant; and if the group of pixels is detected as one of the non-neutral colors, rendering one of the pixels of the group in the CMYK color space using a plurality of colorants forming the CMYK color space.

16. The method for detecting neutral colors as set forth in claim 15, further including:

outputting the rendered group of pixels to a color printing device.

* * * * *